W. J. STEWART, Jr.
MACHINERY SHAFTING.
APPLICATION FILED AUG. 15, 1910.
1,032,163.
Patented July 9, 1912.
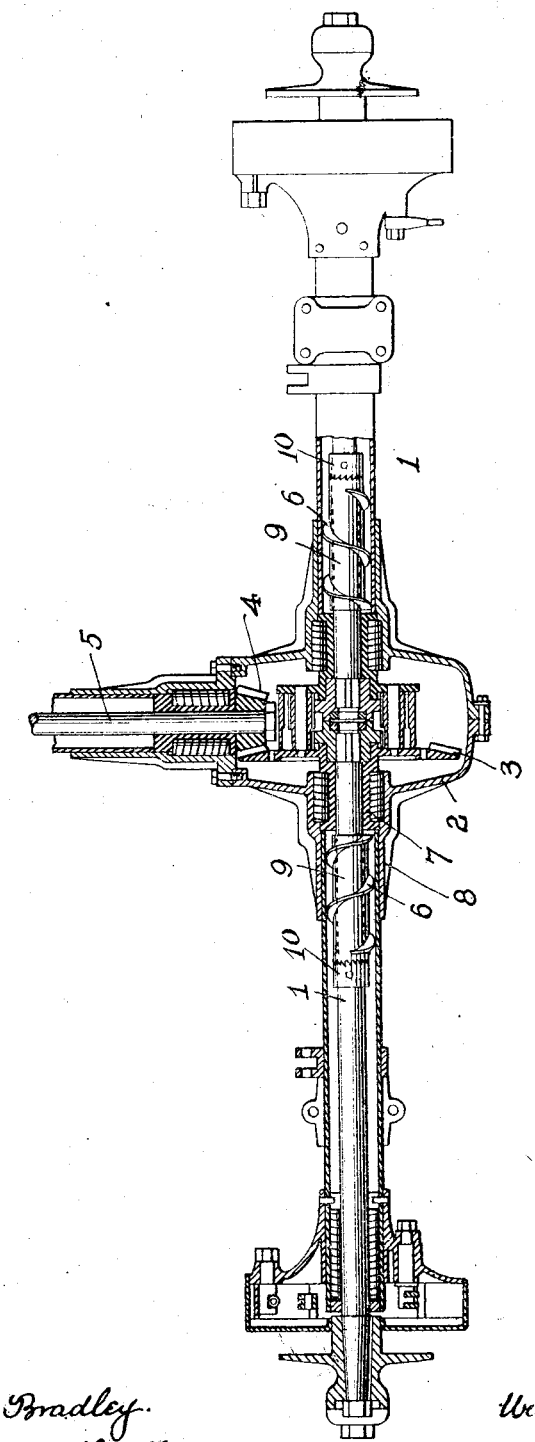
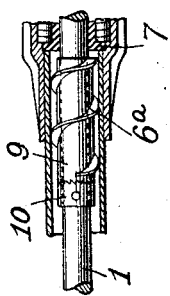
FIG. 2.
WITNESSES:
J. Herbert Bradley.
Theodore Duff
INVENTOR
William J. Stewart Jr.
by Christy and Christy
Atty's

UNITED STATES PATENT OFFICE.

WILLIAM J. STEWART, JR., OF BEAVER, PENNSYLVANIA.

MACHINERY-SHAFTING.

1,032,163.  Specification of Letters Patent.  Patented July 9, 1912.

Application filed August 15, 1910. Serial No. 577,2.

*To all whom it may concern:*

Be it known that I, WILLIAM J. STEWART, Jr., residing at Beaver, in the county of Beaver and State of Pennsylvania, a citizen of the United States, have invented or discovered certain new and useful Improvements in Machinery-Shafting, of which improvements the following is a specification.

My invention relates to improvements in machinery shafting, and the object of my improvement is to provide against the free flow along the shaft of lubricant escaped from a bearing thereof.

My invention is applicable in machinery building of all sorts, and is not limited to any specific application. I have however illustrated it in its application to the rear axle of an automobile, that being an instance of its advantageous use.

In the accompanying drawing, which forms part of this specification, the figure is a view partly in elevation and partly in longitudinal and horizontal section of the rear axle of an automobile with connected parts, with my improvement applied thereto.

The rear axle of the automobile 1 extends through bearing 7 into a centrally arranged gear case 2, within which is arranged upon axle 1 a gear wheel 3 which meshes with a corresponding gear wheel 4 borne upon a power shaft 5, by which the axle is turned and the vehicle driven. Within the gear case, of course, lubricant is freely used, and, though the passage of the shafting through the gear case be packed, it is practically impossible but that in service lubricant will escape beneath the packing and, flowing along the axle, will reach the wheels; and this is injurious to other parts of the machine and is unsightly.

My invention consists in means carried by the shaft and effective upon the normal rotation thereof to impel lubricant (flowing along the shaft) back again toward the bearing from which it has escaped, but ineffective upon the reverse movement of the shaft to impel a reverse flow of the lubricant. To this end a grease deflecting plate 6 is carried by and extends from a sleeve 9 loosely mounted on shaft 1; and shaft 1 is equipped with a clutch member, here in the form of a ratchet block 10, which when the shaft turns in normal direction operatively engages corresponding teeth carried by the sleeve 9 and drives the plate 6, but when the rotation of the shaft is reversed (in consequence of the arrangement of the teeth—a familiar device) leaves the sleeve with the plate which it carries free of positive propelling force.

The presence of escaping grease will ordinarily furnish sufficient resistance to carry sleeve 9 into engagement with block 10 when, after rotation in reverse direction, normal rotation is resumed. If special means are desired for that end, they are well known to the art.

An inclosing case 8 may be provided extending from the bearing longitudinally of the shaft and surrounding the spiral plate 6. Such a casing coöperating with the plate will more effectually throw back the escaping lubricant. As shown, such an inclosing case may be made continuous with the gear casing 2, in the particular instance chosen for illustration.

I claim herein as my invention:

1. The combination with a shaft rotatable within a bearing, of a spiral deflector-plate mounted upon said shaft at a point adjacent to the bearing thereof, a member carried by said shaft operatively engaging said plate when said shaft rotates in one direction, but leaving said plate free when the rotation of the shaft is reversed, substantially as described.

2. The combination with a spiral deflector-plate rotatably mounted upon a rotatable shaft, of means operative upon the rotation of the shaft in one direction to cause the said deflector-plate to rotate with the said shaft, said means inoperative to rotate the deflector-plate when the rotation of the shaft is reversed, substantially as described.

In testimony whereof, I have hereunto set my hand.

WILLIAM J. STEWART, JR.

Witnesses:
 ALICE A. TRILL,
 J. HERBERT BRADLEY.